US005131128A

United States Patent [19]

Bisgaard et al.

[11] Patent Number: 5,131,128

[45] Date of Patent: Jul. 21, 1992

[54] PROTECTION ELEMENT FOR ALL-IN-THE-EAR HEARING AID AND TOOL FOR USE IN THE REPLACEMENT HEREOF

[75] Inventors: Peter N. Bisgaard, Lyngby, Denmark; Simon Ooms, Velp, Netherlands

[73] Assignee: GN Danavox A/S, Copenhagen, Denmark

[21] Appl. No.: 568,850

[22] Filed: Aug. 17, 1990

Related U.S. Application Data

[62] Division of Ser. No. 255,717, Oct. 11, 1988, Pat. No. 4,984,277.

[51] Int. Cl.[5] .......... B23P 19/04

[52] U.S. Cl. .......... 29/239; 29/270

[58] Field of Search .......... 81/3.08, 3.09; 206/438, 206/539, 534.2, 533, 366, 354, 359; 29/239, 270, 278

[56] References Cited

U.S. PATENT DOCUMENTS

| | | | |
|---|---|---|---|
| 2,408,150 | 9/1946 | Moeller | 206/533 |
| 3,197,577 | 7/1965 | Kuklock | 179/184 |
| 3,374,318 | 3/1968 | Martin | 381/686 |
| 3,408,461 | 10/1968 | Langford | 381/686 |
| 3,414,685 | 12/1968 | Geib | 179/107 |
| 4,114,780 | 9/1978 | Sharon | 206/359 |
| 4,168,777 | 9/1979 | Gaskell et al. | 206/359 |
| 4,447,677 | 5/1984 | Miyahra | 179/107 |
| 4,485,925 | 12/1984 | Fickert | 206/438 |
| 4,553,627 | 11/1985 | Gustmeier et al. | 381/686 |
| 4,706,778 | 11/1987 | Topholm | 381/686 |
| 4,706,815 | 11/1987 | Curtis et al. | 200/531 |
| 4,716,785 | 11/1988 | Haertl | 381/686 |
| 4,739,512 | 4/1988 | Hartl et al. | 381/686 |
| 4,862,573 | 9/1989 | Kelson et al. | 206/366 |
| 4,903,390 | 2/1990 | Vidal et al. | 206/359 |
| 4,989,307 | 2/1991 | Sharpe et al. | 206/366 |
| 4,998,334 | 3/1991 | Pemberton et al. | 206/359 |
| 5,024,326 | 6/1991 | Sandel et al. | 206/366 |
| 5,031,768 | 7/1991 | Fischer | 206/438 |

FOREIGN PATENT DOCUMENTS

| | | | |
|---|---|---|---|
| 2258111 | 7/1973 | Fed. Rep. of Germany . | |
| 359163 | 2/1962 | Switzerland | 381/686 |
| 84-04016 | 10/1984 | World Int. Prop. O. . | |

*Primary Examiner*—Robert C. Watson

*Attorney, Agent, or Firm*—Merchant & Gould Smith, Edell, Welter & Schmidt

[57] ABSTRACT

A protection element for the sound conduction channel (6) on an all-in-the-ear hearing aid (1) with a hearing aid housing (2) arranged to suit the user's auditory canal comprises an exchangeable filter element (3) which is snapped firmly on a sound conduction tube (5) which is disposed and secured in the hearing aid's sound conduction channel (6). The filter element (3) has a number of sound conduction openings (12). The invention also relates to a tool and a dispenser for use in the exchanging of the filter element (3).

4 Claims, 4 Drawing Sheets

Figure 1:
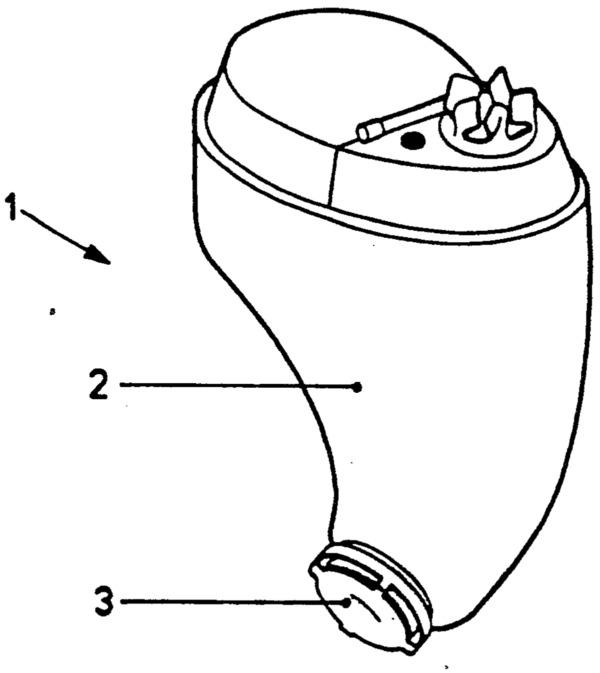

PROTECTION ELEMENT FOR ALL-IN-THE-EAR HEARING AID AND TOOL FOR USE IN THE REPLACEMENT HEREOF

This is a division of application Ser. No. 255,717, filed Oct. 11, 1988, now U.S. Pat. No. 4,984,277.

The invention relates to a protection element for the sound conduction opening on an all-in-the-ear hearing aid.

BACKGROUND

The normal ear produces earwax which is conveyed outwards in the direction of the outer auditory canal by a ciliary system. The presence of a hearing aid in the outer ear can irritate the ear so that the production of wax increases. In connection with the insertion of the hearing aid in the auditory canal, it can happen that wax is pressed into the hearing aid's sound conduction opening, and in certain cases completely into the sound transducer, which is hereby ruined and must be changed. The sound transducer can also be ruined in attempts to clean the sound conduction opening. This phenomenon is a great problem for the propagation of this otherwise very attractive type of hearing aid.

The problem of wax has hitherto been solved in many different ways. Some solutions are based on a special shaping of the tip of the hearing aids, whereby the wax collects in places where it causes no immediate damage and is relatively easy to remove. Other solutions are based on replaceable or cleanable devices called wax filters which intercept the wax.

With the known embodiments, the replacement of the wax filter is a difficult operation. As example can be mentioned two commercially-available systems. The one system has a circular filter cap with internal thread and with a diameter of 3.7 mm and a height of 1.5 mm. In the filter itself there are a number of small sound holes plus two slightly larger holes. An accompanying tool for replacement is in the form of a rod with two studs in the one end. These studs fit into the two larger holes in the filter. When renewing the filter, the studs on the replacement tool are engaged in the corresponding holes in the filter cap, after which the filter cap can be screwed off. The used filter is removed from the tool, and a new filter is mounted on the tool's studs, after which it is screwed on to the hearing aid's threaded stub. Another known system uses rectangular plastic filters which are pressed down in a stub at the sound conduction opening of the hearing aid. These filters are $3\times1\times1.2$ mm. The one side of the filter is provided with a small hole of $1\times0.5$ mm, and along the edges of the filter there is a collar which prevents the filter from being pressed too far into the hearing aid. A bar-shaped tool has a small stud in the one end and a small metal spade in the other end. The spade-shaped end is used to twist a blocked filter out of the hearing aid, and the stud is used to hold a new filter by means of the small hole in the filter edge while the filter is mounted on the hearing aid and pressed into place.

From German presentation document no. 2,258,118 and from U.S. Pat. No. 3,414,685, protection elements for hearing aids of the kind mentioned are known in the form of wax filters. In the patent documents, no guidance is provided with regard to how the filters are exchanged, presumably because this must always be carried out in a workshop for reasons of the filter's very small dimensions.

From U.S. Pat. No. 4,444,677 is known a filter element which can be introduced into the sound conduction opening on a hearing aid, and secured by means of an elastic ear plug which surrounds and is snapped on to an extension of the hearing aid housing itself. The patent document contains no guidance in the exchanging of the filter.

As will be apparent, all of the known methods are characterized by parts with very small dimensions, the handling of which places great demands on both the eyesight and motory abilities. Moreover, the users of hearing aids are frequently elderly people whose eyesight and powers of manipulation do not allow them to handle such small parts. Therefore, the users of hearing aids most often find it necessary to employ the services of a special workshop in order to get a filter replaced.

The object of the invention is to present a protection element of the kind mentioned which is very easy to mount on a hearing aid, and which provides the user with the possibility of being able to renew the filter element without having to resort to a specialist or another helper, if the user has reduced eyesight or poor motory abilities, or is suffering from both ailments.

This is achieved by designing the protection element in accordance with the invention. The protection element consists of a sound conduction tube which is firmly mounted in the hearing aid's sound conduction opening, and a filter element arranged to be mounted on the sound conduction tube by a snap connection between the filter element and the tube. The mounting is effected simply by bringing the filter element and the hearing aid together, preferably by pressing the hearing aid (which is much larger than the filter) against the filter element. The snap connection is designed in such a way that the filter element can be snapped both on and off.

By configuring the protection element according to the invention, the snapping action is effected in a manner which is perceptible, so that the user is directly able to feel in the fingers when the filter element is snapped correctly on the sound conduction tube, in that the snapping-on takes place with a slight click which can be felt with the fingers.

By configuring the protection element according to the invention, one can ensure that neither the filter element nor the sound conduction tube get damaged, even though the mounting of the filter element is effected with a relatively hard pressure. Moreover, the special configuration of the filter edge and the sound conduction tube results in a free edge arising on the filter element. This edge can serve as a surface of engagement for a tool for the removal of the filter element. Furthermore, this configuration results in the tool for the removal of the filter element being able to be very simple in design, cf. the tool discussed later. Moreover, this free edge with the engagement surface turns in towards the hearing aid itself, and thus does not inconvenience the user in any way whatsoever.

By configuring the protection element according to the invention, a relatively inexpensive and uncomplicated filter is achieved, said filter having proved to function in an excellent manner and preventing any ingress of earwax or dirt in the sound conduction opening, without any blocking of the sound conduction opening acoustically. It is very advantageous that the filter element can be produced for a low price, hereby enabling the hearing aid users to change the filter element frequently, so that a blockage capable of reducing the function of the hearing aid is avoided. Moreover, the configuration results in the filter element being slightly springy, which enables it to be designed with relatively tight fitting against the sound conduction tube, without this having any negative influence on the exchanging of the filter element. In addition, the configuration enables the outer side, i.e. that side of the filter element which faces in towards the user's ear drum, to be provided with rounded and completely smooth surfaces, so that the filter element is of no inconvenience whatsoever for the user.

By configuring the protection element according to the invention, the necessity is avoided of having to make precise and accurate contact when the hearing aid and the filter element are brought together during the mounting of a new filter element, in that the parts are shaped in such a way that they are guided into place for the snapping together, which is a very great advantage when the users themselves need to mount a new filter element on the hearing aid.

By configuring the protection element according to the invention, the possibility is afforded of providing it with smaller diameters, i.e. the whole construction can be of a slimmer form, and can thus be better used by persons with narrow auditory channels.

The invention also relates to a tool for use in the removal of a filter element from a hearing aid, in that said tool is arranged for use by the users of the hearing aids themselves. The tool must be designed in such a manner that there is no way in which it can be used incorrectly, and such that it cannot damage the hearing aid in any way, regardless of how the user applies the tool. This is achieved by designing the tool according to the invention. The tool consists simply of a plate, preferably of plastic, and with an opening of a certain clearance or diameter. The hearing aid is brought with the sound conduction opening against the opening in the tool, against which it is firmly pressed. The area on the tool is slightly funnel-shaped towards the opening, so that the hearing aid's sound conduction opening with the filter element is led towards said opening. When the hearing aid is again drawn free of the opening, the filter element is removed from the hearing aid. Also here the user will be able to perceive a slight click, which indicates that the filter has been removed. If one is in doubt, the operation may merely be repeated, in that repeated attempts will damage neither the hearing aid nor the sound conduction tube.

It can be an adavantage for the tool to be in the form of a dispenser. By this is achieved that the filter sits firmly in the dispenser until it is secured correctly on the sound conduction tube. When it is sitting correctly and firmly on the sound conduction tube, and one thereafter removes the hearing aid from the dispenser, the filter element is released along the break-lines and the hearing aid is again ready for use. Furthermore, in this way the tool is both a tool for the removal of the used filters, and a tool for assisting in the mounting of new filters, while at the same time it contains a closed chamber in which the used filters are collected, thus preventing them from being inadvertently reused, and avoiding inconveniences as a consequence hereof.

The tool according to the invention can be configured, whereby one always has a clear view of how many new filters are remaining in the dispenser, in that this can be observed directly through the transparent cover. The transparent, turnable cover has a delivery opening which can be turned to stand over a new filter and help the user, so that he can more easily guide the hearing aid down against the new filter when this is required to be mounted. In this configuration, the tool itself can constitute sales packing for new filters, thus rendering further packing unnecessary.

Figure 2:
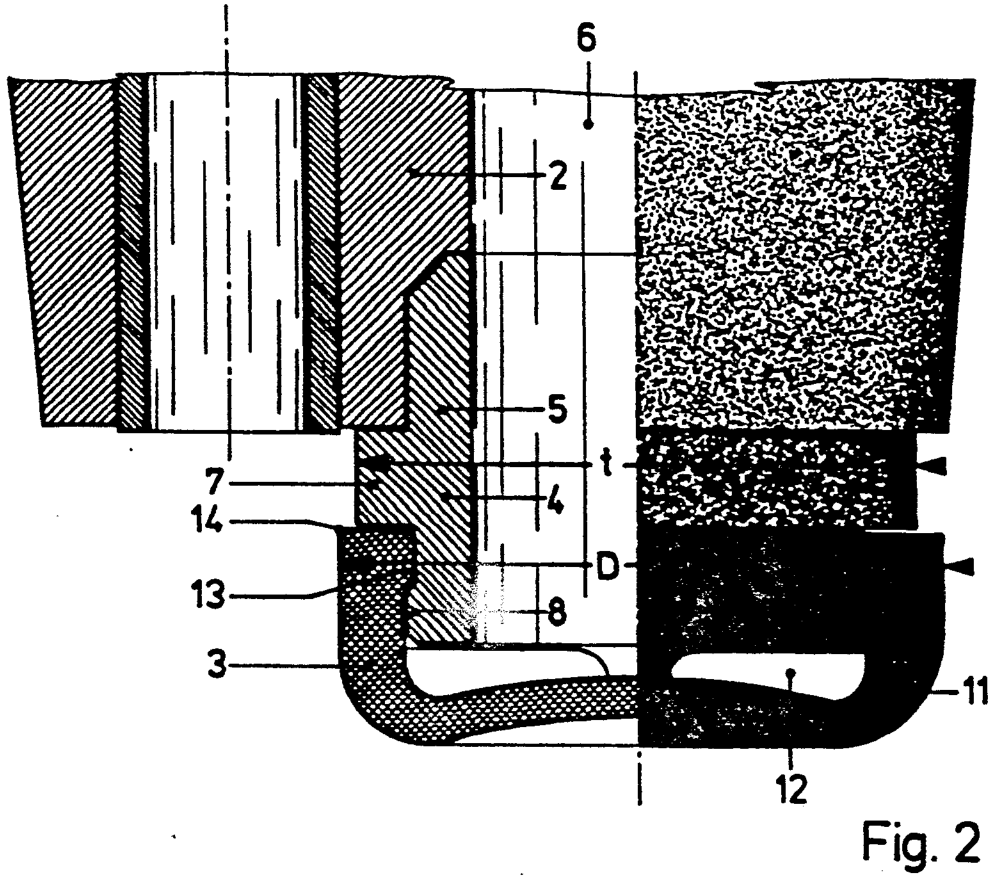
Figure 3:
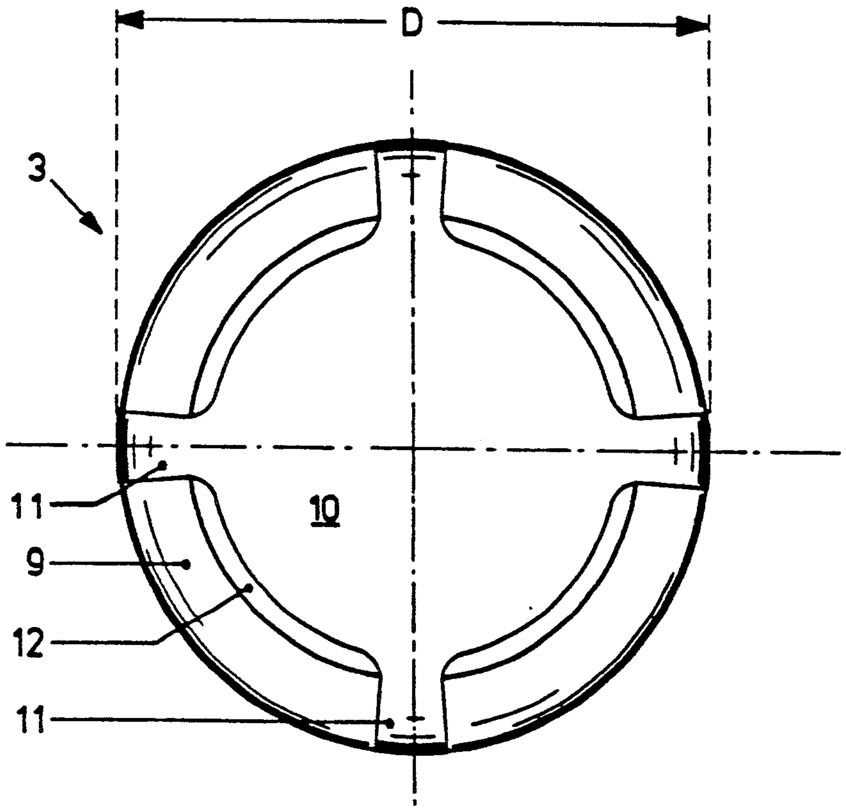
Figure 4:
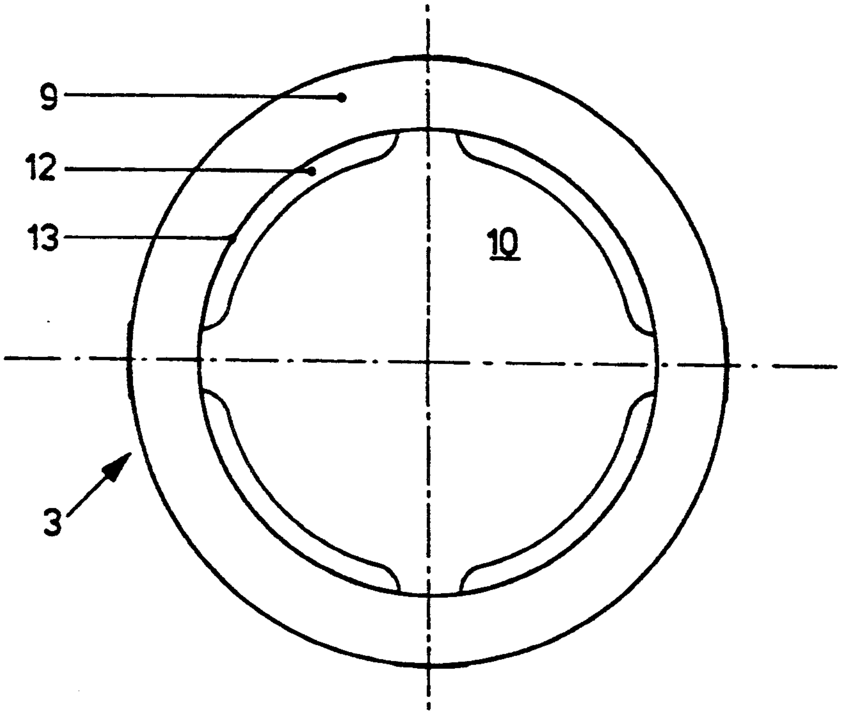
Figure 5:
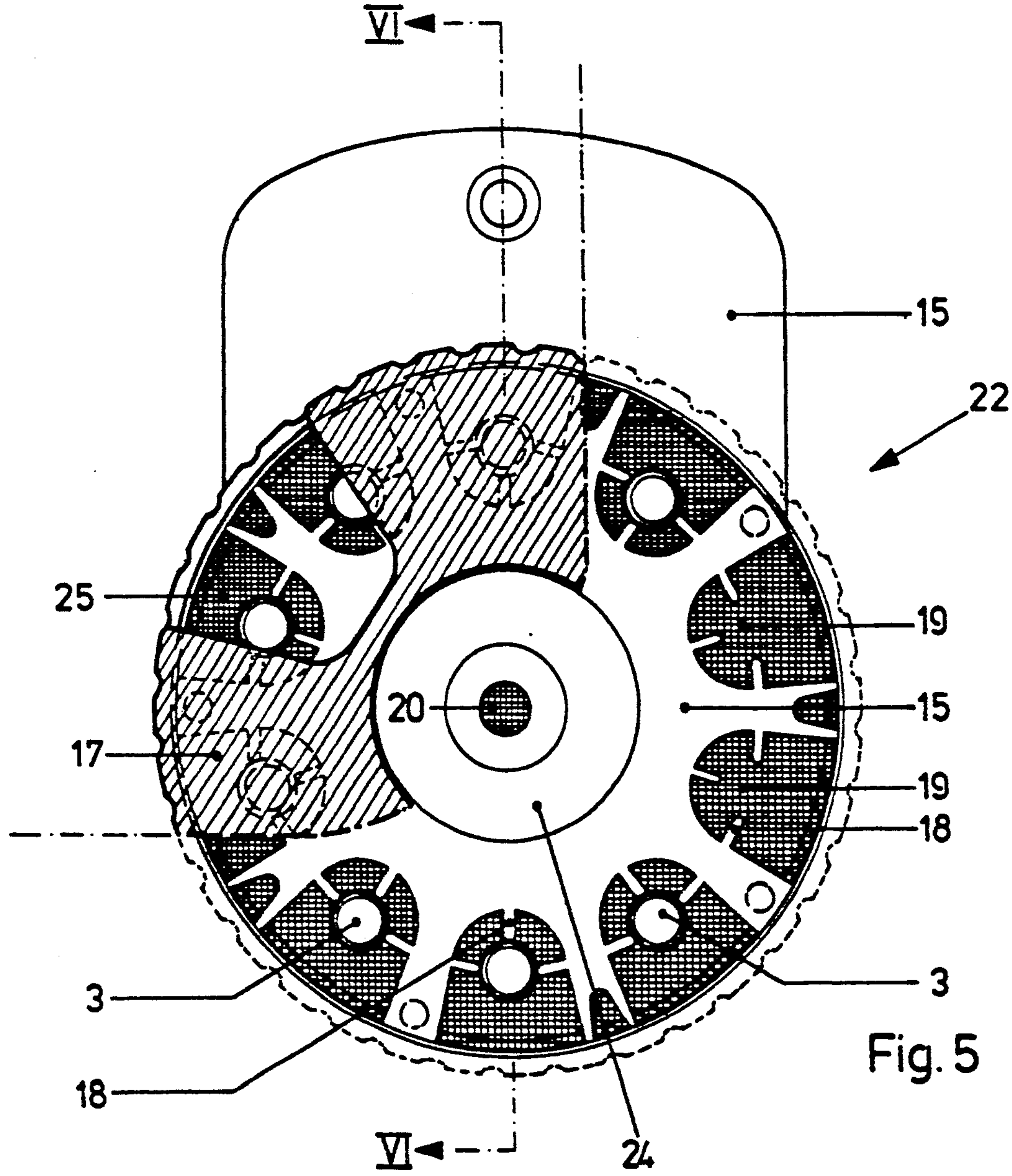
Figure 6:
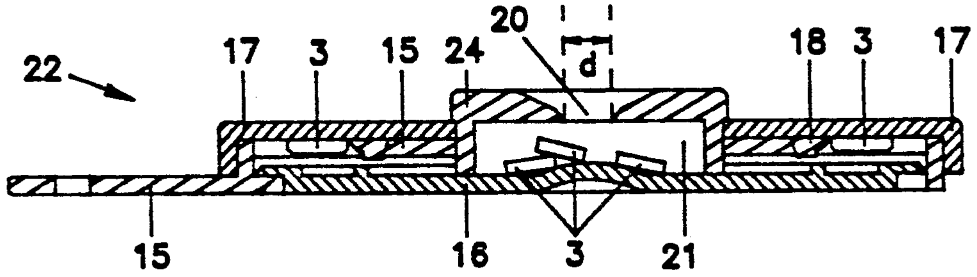
Figure 7:
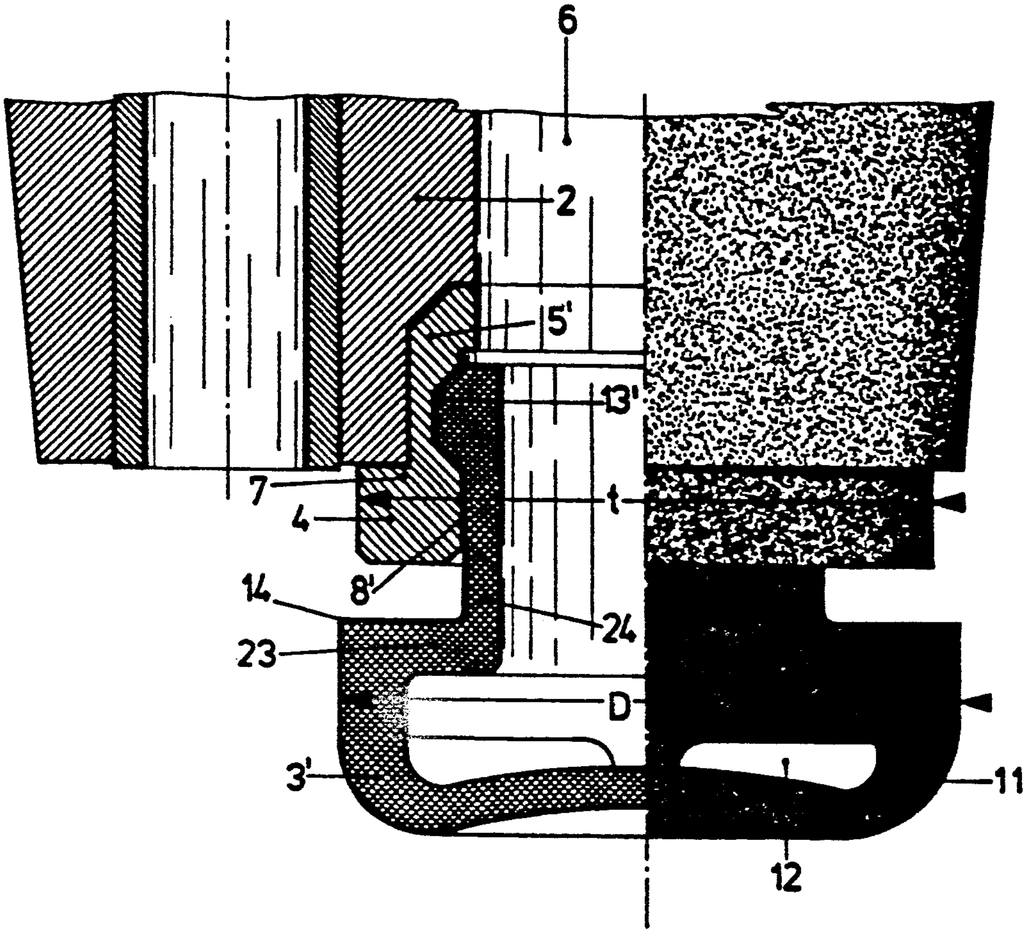

The invention will now be described in closer detail with reference to the drawing, in that FIG. 1 shows an all-in-the-ear hearing aid with protection element according to a first embodiment of the invention, FIG. 2 shows, on a larger scale and partly in plane section through the sound conduction end, a mounted protection element according to the invention, FIG. 3 shows the filter element itself seen from the outer side, FIG. 4 shows the filter element itself seen from the inner side, FIG. 5 shows a dispenser with new filters, FIG. 6 shows a plane section in the dispenser in FIG. 5, seen in the direction VI—VI, and FIG. 7 shows an all-in-the-ear hearing aid with protection element according to a second embodiment of the invention.

In FIG. 1 of the drawing is seen a normal all-in-the-ear hearing aid 1 which comprises a housing of thermoplastic material which contains the whole of the electronic circuit, sound receiver, sound transducer plus battery and regulation elements. In the tip 2 of the housing there is a sound conduction end with a protection element comprising a filter element 3, so that earwax cannot penetrate in through the sound conduction end, which via a short sound channel leads to the sound transducer.

In FIG. 2 is seen a plane section on a larger scale through the sound conduction channel 6 in the housing 2, the bottom of said channel 6 being terminated with a sound conduction tube 5 of plastic or steel. In the tip end of the hearing aid housing 2 can also be provided a ventilation opening, as shown in the left side of FIG. 2.

The sound conduction tube 5 will normally be axis symmetrical, as shown in FIG. 2, and be secured in the housing 2 of the hearing aid by means of adhesive, crimping or by other means. The tube 5 has a free end 4 which extends outside the housing, and the part which lies outside of the housing is provided with a circular collar 7 which abuts against the outer side of the housing 2. The free end 4 of the tube part is provided with a projecting flange 8 with chamfered or rounded edges, as shown. The filter element 3, which is in the form of a cap which can be snapped down over the free end of the sound conduction tube, has a circular flange 13 around its inside edge. For reasons of the resilient construction of the filter element 3, said circular flange 13 can be snapped down over the projecting flange 8 on the tube 5. The filter element 3 has an external diameter D which is greater than the external diameter T of the sound conduction tube 5, so that there arises an annular, free and sharp edge 14 with an engagement surface in which a tool for the removal of the filter element 3 can gain a hold.

In FIGS. 3 and 4 is seen the actual filter element 3, which is a one-piece plastic part and comprises an annular and cylindrical part 9, a plane masking part 10 and a number of bridge parts 11 between said two parts. There thus arises a number of sound conduction openings 12, partly concealed by the masking part 10 which covers the openings 12 so that wax and the like cannot directly penetrate through the openings and into the sound conduction tube 5, and thereby into the sound conduction channel 6.

In FIGS. 5 and 6 of the drawing is seen a tool designed as a dispenser 22 and for use in the replacement of filter elements 3 according to the invention. The dispenser consists of three parts 15,16,17, all of which are preferably of plastic. The part 15, which constitutues a support part for the remaining parts, also comprises a number of moulded filter elements 3 which are moulded in one with the support part 15, and which at the bridge-like deadheads 18 are firmly connected to the support part 15. The deadheads 18 narrow down towards the filter elements, so that said elements can be broken free of the deadheads in such a manner that the deadheads remain sitting firmly on the part 15. Below the filter elements, which in the example shown are disposed in a ring in the dispenser, is provided a bottomplate 16 which serves as underlayer and support when a filter is being mounted by the hearing aid's sound conduction tube being pressed down into the filter element. In addition, the dispenser comprises a transparent cover 17 with an opening 25. This opening 25 can be turned into place over an unused filter when the filter is to be secured to a hearing aid. A central part 24 of the support part 15 is formed as a chamber 21 which is closed by the bottomplate 16. The chamber has a centrally disposed opening 20 with a clearance or diameter d which is smaller than the outer diameter D of the filter element. Preferably, d is equal to t, see FIG. 2. The chamber 21 is intended for the collection of used filter elements. 19 indicates an empty place from which the filter element has been removed. The central part 24 will preferably be of a slight funnel shape in towards the central opening 20.

When a hearing aid 1 with filter element 3 is pressed down against the opening 20, the filter element 3 will be able to be fed in through the opening 20 and into the chamber 21 with a slight click. When the hearing aid is removed again, the edge 14 of the filter element will abut against the under edge of the opening 20, and the filter element will be removed and remain in the chamber 21.

It will be obvious to those skilled in the art that the configuration of the sound conduction tube 5 and the filter element 3 shown in the drawing is only an example of how these can be configured. Said parts can be designed in many other ways without deviating from basic concept of the invention. FIG. 7 of the drawing shows an example of an embodiment in which the filter element 3' is snapped firmly inside the sound conduction tube 5'. The same reference figures have been used for all parts as in FIG. 2, and those parts which are configured differently are indicated with the FIGS. 3', 5', 8' and 13'. The inside of the sound tube 5' has a recess which prevents the filter element 3' from being pressed too far inside the tube. The filter element 3' has an annular bottom part 23 which goes over to a tubular part 24 which is arranged for insertion into the sound conduction tube, said tube having an internal annual groove for the flange 13' on the filter unit 3'. This filter unit 3' is mounted and removed in the same manner as described earlier in connection with the first embodiment.

Similarly, the dispenser shown in FIGS. 5 and 6 is solely an example of how such a tool can be arranged for use in the exchanging of filter elements.

In the examples shown in the drawing, the filter element is of the following dimensions: D=4.2 mm and the greatest height of the filter element is 1.45 mm. The sound conduction tube has an axial length of 2.65 mm and t=3.9 mm.

We claim:

1. A dispenser for a hearing aid filter elements, comprising a plurality of filter elements formed on a unitary support plate, said elements being joined to said plate by a plurality of deadheads extending from the periphery of each element to the plate, said deadheads being provided with break-lines immediately at said periphery, said plate having a filter removal portion which includes an upper surface and an aperture having a diameter smaller than that of said element at its periphery, said upper surface being slightly funnel shaped concentric with said aperture.

2. A dispenser according to claim 1 wherein said aperture is centrally located in said plate and wherein said elements are located circumferentially around said aperture in a spaced apart relationship.

3. A dispenser according to claim 2 wherein said plate is circular and further includes a generally transparent coverplate rotatably affixed to said support plate and concentric with said aperture, said coverplate extending over said filter elements and have an access aperture positioned to permit access to at least one of said elements through the cover.

4. A dispenser according to claim 1 further including a bottom plate affixed to said support plate but spaced apart therefrom at least adjacent said aperture, thereby forming a chamber between said aperture and said bottom plate for receiving spent filter elements.

* * * * *

UNITED STATES PATENT AND TRADEMARK OFFICE

CERTIFICATE OF CORRECTION

PATENT NO. : 5,131,128

DATED : July 21, 1992

INVENTOR(S) : Peter N. Bisgaard et al.

It is certified that error appears in the above-identified patent and that said Letters Patent is hereby corrected as shown below: Title page, Item [62] Under "Related U.S. Application Data", please insert foreign priority --Denmark- Application No. 5384/87- filed 10-14-87--.

Signed and Sealed this

Nineteenth Day of October, 1993

Attest:

Bruce Lehman

BRUCE LEHMAN

*Attesting Officer* *Commissioner of Patents and Trademarks*